H. G. ELLSWORTH.
FEED ROLLER FOR CARDING MACHINES.

No. 5,272. Patented Aug. 4, 1847.

Inventor
H. G. Ellsworth.

UNITED STATES PATENT OFFICE.

H. G. ELLSWORTH, OF ENFIELD, CONNECTICUT.

IMPROVEMENT IN FEED-ROLLERS FOR CARDING-MACHINES, &c.

Specification forming part of Letters Patent No. 5,272, dated September 4, 1847.

*To all whom it may concern:*

Be it known that I, H. G. ELLSWORTH, of Enfield, county of Hartford, and State of Connecticut, have invented a new and Improved Feed-Roller for Cards and other Machinery, which improvement consists in first cutting a screw-thread around the roller and then fluting it, and thereby forming teeth, which do not come in direct rows, one exactly after the other, but may be said to break joints.

The following is the exact description thereof.

To enable others skilled in the art to make and use my invention, I proceed to describe it with reference to the drawings annexed, in which—

Corresponding letters refer to corresponding parts.

Figure 1:
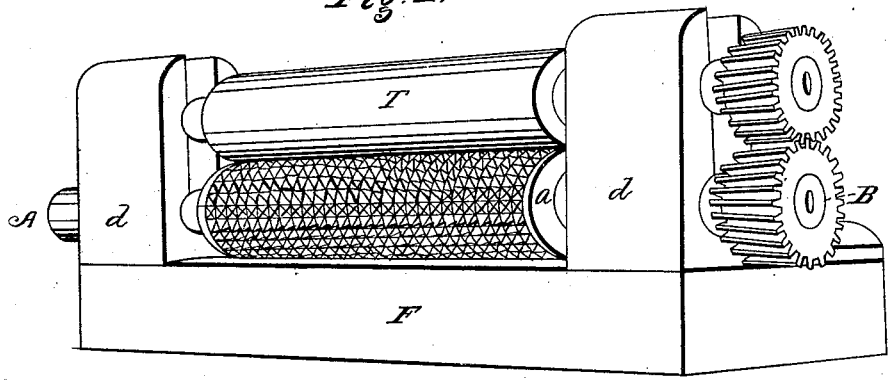
Figure 1 is a perspective view of top and bottom rollers, F being a frame, d d iron studs forming bearings for the necks of the rollers, T top roller, made of wrought-iron or steel, and A B the bottom roller, made also of iron or steel.
Figure 2:
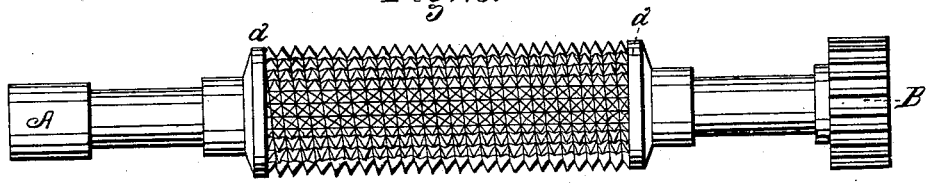
Fig. 2 is a plan view of the bottom roller.

A B, Figs. 1 and 2, are the toothed rollers. I make said roller by first cutting a screw-thread around it more or less fine, or by turning grooves in and around it. It is then fluted in the ordinary way from one collar to the other, thereby forming teeth.

a a are collars on and near the ends of the rollers. Said collars are just the height of the tops of the teeth and are for the purpose of keeping the top roller from touching said points.

There is a gear-wheel on the end B for the purpose of producing uniformity of motion between the top and bottom rollers.

I am aware that there have been various devices used for preventing feed-rollers from lapping and for more effectually straightening the stock before it leaves them; hence they have been covered with card-teeth, with leather, and have been fluted; but all has been to little or no purpose, and cards using either cotton or wool are subject to much and serious injury—a difficulty which my roller prevents. I shall therefore disclaim the fluting of the roller; but What I do claim as my invention, and desire to secure by Letters Patent, is—

The combination of the fluting with the screw-thread or grooves on the surfaces of feed-rollers, thereby forming teeth which straighten the fibers and more effectually prevent lapping.

In testimony whereof I, the said H. G. ELLSWORTH, hereto subscribe my name in presence of the witnesses whose names are hereto subscribed.

Dated at Hartford on this 15th day of March, A. D. 1847.

H. G. ELLSWORTH.

Witnesses:
  S. SMITH,
  I. B. STARR.